United States Patent
Chang (10) Patent No.: US 10,171,160 B2
(45) Date of Patent: Jan. 1, 2019

(54) ACCESSING LP TRANSPONDERS WITH CP TERMINALS VIA WAVEFRONT MULTIPLEXING TECHNIQUES

(71) Applicant: SPATIAL DIGITAL SYSTEMS, INC., Agoura Hills, CA (US)

(72) Inventor: Donald C. D. Chang, Thousand Oaks, CA (US)

(73) Assignee: SPATIAL DIGITAL SYSTEMS, INC., Agoura Hills, CA (US)

(*) Notice: Subject to any disclaimer, the term of this patent is extended or adjusted under 35 U.S.C. 154(b) by 0 days.

(21) Appl. No.: 15/420,114

(22) Filed: Jan. 31, 2017

(65) Prior Publication Data

US 2017/0141838 A1 May 18, 2017

Related U.S. Application Data

(63) Continuation of application No. 13/938,266, filed on Jul. 10, 2013, now Pat. No. 9,559,416, which is a continuation of application No. 13/172,620, filed on Jun. 29, 2011, now Pat. No. 8,538,326.

(60) Provisional application No. 61/497,852, filed on Jun. 16, 2011.

(51) Int. Cl.

| H04B 7/185 | (2006.01) |
| H01Q 9/04 | (2006.01) |
| H01Q 21/24 | (2006.01) |
| H04J 14/06 | (2006.01) |
| H01Q 3/24 | (2006.01) |
| H04B 7/06 | (2006.01) |
| H04L 5/00 | (2006.01) |
| H04L 5/02 | (2006.01) |
| H04W 24/02 | (2009.01) |
| H04W 72/04 | (2009.01) |

(52) U.S. Cl.
CPC ............ *H04B 7/1853* (2013.01); *H01Q 3/24* (2013.01); *H01Q 9/0407* (2013.01); *H01Q 21/245* (2013.01); *H04B 7/0617* (2013.01); *H04J 14/06* (2013.01); *H04L 5/005* (2013.01); *H04L 5/026* (2013.01); *H04W 24/02* (2013.01); *H04W 72/0446* (2013.01)

(58) Field of Classification Search
None
See application file for complete search history.

(56) References Cited

U.S. PATENT DOCUMENTS

2008/0291864 A1* 11/2008 Chang ................. H04B 7/2041
370/316

* cited by examiner

*Primary Examiner* — Alejandro Rivero
(74) *Attorney, Agent, or Firm* — Phuong-Quan Hoang (57) ABSTRACT

A satellite communications system for communicating at a first frequency slot with first and second pairs of satellite transponders in linear polarization format. The system comprises a first terminal, a second terminal and a station. The first terminal receives at least one first input signal and concurrently radiates a first output signal at the first frequency slot to the first and second pairs of satellite transponders via a first beam and a second beam, respectively, in right-hand circularly polarized format. The second terminal receives at least one second input signal and concurrently radiates a second output signal at the first frequency slot to the first and second pairs of satellite transponders via a third beam and a fourth beam, respectively, in left-hand circularly polarized format. The station receives four satellite signals from the first and second pairs of transponders and recovers the at least one first input signal and the at least one second input signal using wavefront multiplexing technique.

20 Claims, 9 Drawing Sheets

Wavefront (WF) muxing
via both polarizations and frequencies $$\begin{Bmatrix} x1 \\ x2 \\ x3 \\ x4 \end{Bmatrix} = \begin{bmatrix} 1 & i & 1 & i \\ i & 1 & i & 1 \\ 1 & i & -1 & -i \\ i & 1 & -i & -1 \end{bmatrix} \begin{Bmatrix} s1 \\ s2 \\ s3 \\ s4 \end{Bmatrix}$$

521  522  523

Wavefront (WF) muxing
via polarizations only $$\begin{Bmatrix} x1 \\ x2 \end{Bmatrix} = \begin{bmatrix} 1 & i \\ i & 1 \end{bmatrix} \begin{Bmatrix} s1 \\ s2 \end{Bmatrix}$$

ACCESSING LP TRANSPONDERS WITH CP TERMINALS VIA WAVEFRONT MULTIPLEXING TECHNIQUES

CROSS-REFERENCE TO RELATED APPLICATIONS

This application is a continuation of application Ser. No. 13/938,266 filed on Jul. 10, 2013, which is a continuation of application Ser. No. 13/172,620, filed on Jun. 29, 2011, now U.S. Pat. No. 8,538,326, which claims the benefit of provisional application No. 61/497,852 filed on Jun. 16, 2011.

BACKGROUND OF THE INVENTION

1. Field of the Invention

The present invention relates to radio frequency communications devices. More particularly, it relates to allowing satellite transponders and ground terminals that utilize one polarization method (linear or circular polarization) to be able to cross-communicate with each other via wavefront multiplexing techniques. This offers many potential advantages, including but not limited to improved flexibility and increased efficiency of existing assets.

2. Description of Related Art

Satellite Communications (SATCOM) technologies have increased dramatically and have transitioned to IP-based services consistent with concepts for net-centric operations. Their increased use has resulted in a proliferation of IP-based products using satellites for back-bone or transport applications. On the other hand, high-speed satellite communications for access typically emanate from reflector antennas that basically radiate and receive in narrow beams.

Compatible polarization configurations between terminals and space assets are essential to efficient satcom links. It is generally true that the LP polarized terminals will use LP transponders, and CP terminals relay data via CP transponders. When ground terminals switch services from a provider with CP satellites to another one with LP satellites, their antenna polarizations are reconfigured accordingly, to prevent 3 dB SNR losses in receiving (Rx) functions on the one hand, and to avoid generating unwanted radiations in transmit (Tx) functions on the other hand. Our approach is very different than those of polarization switching, and would not require users to switch polarizations based on their equipment. Circularly Polarized (CP) users can use their existing terminals to relay data to CP destinations via linearly polarized (LP) transponders. There are no space asset losses due to the incompatibility. The method of LP space asset reorganization is the key for operationally circumventing the "incompatibility" issue.

A concept of the virtual-link concurrently utilizes N communications links organized by Wavefront (WF) Multiplexing (Muxing). A WF carrying a signal stream features a fixed spatial phase distribution among selected N parallel links, which support up to N orthogonal WFs carrying N independent signals concurrently from a source to a destination. The virtual link techniques are referred to as Orthogonal Wave-Front Diversity Multiplex (OWFDM), and the enabling signal structures as OWFDM waveforms.

Virtual links can be applied for satellite communications transporting data within a field of views common to selected transponders. Our proposed "Polarization Utility Waveforms" can successfully deliver signals via LP transponding satellites using CP ground terminals, and vice versa. They are engineered via techniques of signals spreading over multiple transponders. The waveforms may look like OFDM waveforms and also may appear as MIMO formats, but they are not. They are subsets of OWFDM waveforms and may feature unique format interconnecting OFDM and MIMO through an orthogonal signal structure.

WF muxing/demuxing techniques are powerful tools for path length equalizations among parallel paths/channels. SDS has applied these techniques for various applications; (1) Power combining from multiple transponders from the same satellites and/or different transponding satellites [1], (2) back channel equalization for ground based beam forming process in satellite applications [2], and (3) Distributed data storage [3].

Uniqueness of the OWFDM

Unlike OFDM for commercial wireless communications feature waveforms with multiple orthogonal sub-carriers uniformly distributed in a frequency band, our proposed OWFDM techniques will spread transmitting (Tx) signals into multiple channels with a unique phase distribution pattern, referred to as a wavefront (WF). These channels may be assigned to different frequency slots, time slices, polarizations, and/or orbital positions when these space assets are available. The selected multi-dimensional waveforms may be dynamic, and reconfigurable. There will always be embedded pilot signal streams through the same propagating paths, but distributed in phase distribution patterns orthogonal to the one which carries the desired signal stream. In short, the WFs are orthogonal to one another.

In general, the OWFDM waveforms must meet existing SATCOM polarization and frequency convention restrictions. At a ground station, transmitting (Tx) signals may be preprocessed by a WF multiplexer (muxer), which spreads coherent signals into multiple channels concurrently in the form of an orthogonal structure in a selected N-dimensional domain. The generated orthogonality is among multiple wavefronts (WFs). With N parallel propagating channels, there are N-orthogonal WFs available. Probing signal streams will be attached to at least one of them. The remaining WFs are available for various Tx signal streams.

Signals originated from a ground terminal propagating through various uplink carriers/paths, including multiple transponders on a satellite or among many satellites, and different down link frequencies/paths arriving at a destination feature differential phase delays, Doppler drifts, and amplitude amplifications/attenuations.

Post processing implemented at receiving (Rx) sites will equalize the differential phase delays, frequency drifts and amplitude attenuations among signals through propagating paths. Calibrations and equalizations take advantages of embedded probe signals and iterative optimization loops. There are no feedbacks required through back channels. As a result of the equalizations, the Rx WFs become orthogonal, and the attached signals streams are then precisely reconstituted by the WF demuxer.

SUMMARY OF THE INVENTION

This invention presents a subset of OWFDM waveforms taking advantage of polarization incompatibility (CP vs. LP) to access available space assets when the ground terminals are not polarization compatible. We will present the operation concepts and associated mechanisms for CP-equipped terminals to access LP satellites without sacrificing space asset utility efficiencies and capacity. Similar methods can be implemented for LP terminals to access CP satellites. In addition, these techniques also enable sources with CP terminals to communicate sinks with LP terminals via satellite assets with either CP or LP polarization formats as long as the sources and sinks are within the field of view of the selected satellite assets.

Special OWFM waveforms are constructed under the constraints that all the user terminals feature only one of the two available CP options while the space assets in geostationary satellites feature both LP channels of separated transponders in an orbital slot. As a result, the targeted LP space assets support not only regular LP users but also additional CP customers without power and bandwidth capacity losses due to the polarization incompatibility.

We will use SCPC (single channel per carrier) channels as examples for illustrations. However, the concepts can be extended for scenarios such as MCPC cases. SCPC refers to using a single signal at a given frequency and bandwidth so the satellite bandwidth is dedicated to a single source. Multiple channels per carrier (MCPC), on the other hand, uses several subcarriers that are combined into a single bitstream before being modulated onto a carrier transmitted from a single location to one or more remote sites.

Among additional benefits, these techniques will provide means for dynamic space resource allocations such as down link power, or equivalently D/L EIRP. Various channels, such as SCPCs in different transponders, are grouped and utilized by multiple users via OWFDM, therefore, the combined "power" assets can be dynamically assigned to any of the users as long as the total power outputs are constant. For example, two independent CP users accessing a two convention 5 W CP SCPC channels separately, both user may only draw a maximum of 5 W. On the other hand, when the same independent CP users accessing two 5 W LP SCPC channels organized by OWFDM concurrently, the first user may draw 8 W while the second user only need 2 W, and at a later time the first user may not need to transmit any more while the second user can access both transponders coherently to get 10 W equivalent "transponder power"; or a 3 dB more gain on equivalent EIRP.

REFERENCES

1. U.S. patent application Ser. No. 12/462,145; "Communication System for Dynamically Combining Power from a Plurality of Propagation Channels in order to Improve Power Levels of Transmitted Signals without Affecting Receiver and Propagation Segments," by D. Chang, initial filing on Jul. 30, 2009.
2. U.S. patent application Ser. No. 12/122,462; "Apparatus and Method for Remote Beam Forming for Satellite Broadcasting Systems," by Donald C. D. Chang; initial filing May 16, 2008.
3. U.S. patent application Ser. No. 12/848,953. "Novel Karaoke and Multi-Channel Data Recording/Transmission Techniques via Wavefront Multiplexing and Demultiplexing," by Donald C. D. Chang, and Steve Chen Initial Filing on Aug. 2, 2010.
4. U.S. patent application Ser. No. 12/847,997; "Polarization Re-alignment for Mobile Satellite Terminals," by Frank Lu, Yulan Sun, and Donald C. D. Chang; Filing on Jul. 30, 2010.

DETAILED DESCRIPTION OF THE PREFERRED EMBODIMENT

Figure 1:
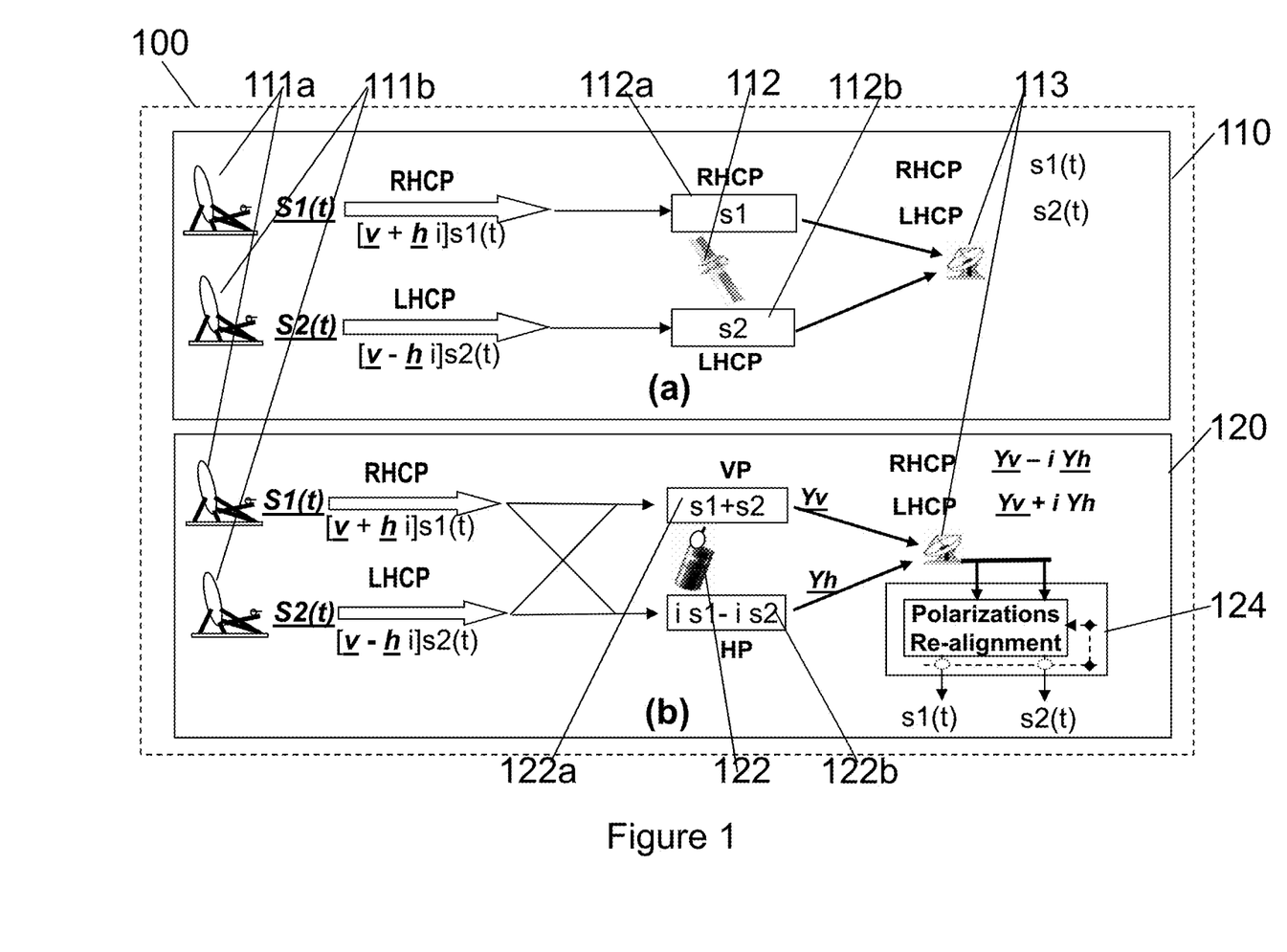
FIG. 1 depicts simplified block diagram of a LP satellite accessed by two CP terminals to relay independent data streams to a CP hub station. It displays return-links from two users to a hub.

FIG. 1 100 illustrates examples of our proposed techniques assuming that CP satcom ground terminals are within a common field of view of both transponding satellites. They are return-links (RL) examples depicting communications from 2 remotes to a hub through transponding satellites.

Panel (a) 110 illustrates a conventional technique accessing a CP space asset 112 via CP terminals 111 and 113. Terminals 1 111a and 2 111b are relaying independent data streams s1(t) and s2(t) to a hub through a CP satellite 112. The terminal 1 111a in right-hand circularly-polarized (RHCP) is allocated for RHCP SCPC channel 112a at a frequency slot, fo, on the CP satellite. SCPC stands for Single channel per carrier and refers to using a single signal stream at a given frequency and bandwidth. Similarly, the terminal 2 111b in left-hand circularly-polarized (LHCP) is allocated for a second SCPC channel 112b at the same frequency slot, fo, but in LHCP on the satellite. As a result, s1(t) goes through a RHCP transponder while s2(t) is independently conditioned by another transponder in LHCP, respectively. Hub 113 receives both s1(t) and s2(t) independently through separated antenna ports; s1(t) from a RHCP port and s2(t) a LHCP port.

Panel (b) 120 depicts an operational scenario where CP terminals 111 relay data through a LP satellite 122. Specifically, SCPC channels 122a and 112b are used in the LP satellite, with 1 HP and 1 VP channels on an identical frequency slot.

Mathematically, we select a set of 2-dimensional orthogonal Wave-Front (WF) vectors [1, i] and [1, −i] to match with the signal structures of polarizers for RHCP and LHCP signals. The 2-to-2 WF muxers and demuxers are implemented by analog polarizers in RF instead of 2-to-2 FFT digital processors.

$$S1(t)=[v+h\ i]s1(t) \quad (1a)$$

$$S2(t)=[v-h\ i]s2(t) \quad (1b)$$

S1 radiated by terminal 1 111a feature RHCP while S2 by terminal 2 111b is in a LHCP format. Equivalently, S1 in RHCP is transmitted in both HP and VP with a fixed phase distribution; that the phase in HP is always 90° ahead of that in VP.

As the S1 signals in RHCP arriving at a selected LP satellite 122, both VP and HP components will be picked up "concurrently" by two SCPC channels at a common frequency slot but one in a VP 122a and the other in a HP 122b transponders accordingly as depicted.

Similarly S2 is also transmitted in both HP and VP concurrently with a fixed phase distribution; that the phase in HP is always 90° behind that in VP. As the S2 signals in LHCP arriving at a selected LP satellite 122, both VP and HP components will be picked up "concurrently" by two SCPC channels; one in a VP 122a and the other in a HP 122b transponders accordingly as depicted.

Each LP SCPC channel is occupied by two independent signals s1 and s2 concurrently. As far as each SCPC channel is concerns, the two signals can not be separated since they are not multiplexed by code, time or frequency. On the other hand, there are "relationships" between the two s1 signals in both SCPC channels, and similarly but different relationships for s2 signals. The two sets of relationships are two orthogonal "wavefronts" (WFs). Because of the unique relationship, s1 and s2 can be separated and recovered when both SCPC channels are processed simultaneously.

The conditioned signals by the VP SCPC 112a and HP SCPC 122b are designated as Yh (t) and Yv(t) respectively. The amplitude attenuations and phased delays due to propagation and on board electronics for the HP and VP paths are identified as (Ah and Av) and (α and β) respectively.

As the signals arrive at a CP hub, the RF polarizer from a Rx CP antenna will serve as the WF demuxer functions, and two concurrent CP antenna outputs will be:

$$Z\ rhcp(t)=[Av\exp(j\alpha)*Yv(t)-i\ Ah\exp(j\beta)*Yh(t)]/2 \quad (2a)$$

$$Z\ lhcp(t)=[Av\exp(j\alpha)*Yv(t)+i\ Ah\exp(j\beta)Yh(t)]/2 \quad (2b)$$

Furthermore, in terms of s1 and s2, Equation (1) can be re-written as:

$$Zrhcp(t) = [Av\exp(j\alpha)*(s1+s2) - iAh\exp(j\beta)*(is1-is2)]/2 \quad (3a)$$
$$= s1[Av\exp(j\alpha) + Ah\exp(j\beta)]/2 + s2[Av\exp(j\alpha) - Ah\exp(j\beta)]/2$$

$$Zlhcp(t) = [Av\exp(j\alpha)*(s1+s2)Yv(t) + iAh\exp(j\beta)*(is1-is2)]/2 \quad (3b)$$
$$= s1[Av\exp(j\alpha) - Ah\exp(j\beta)]/2 + s2[Av\exp(j\alpha) + Ah\exp(j\beta)]/2.$$

In general, the two wavefronts will not be "orthogonal" anymore when they arrive at a destination 113 on ground. A diagnostic and an equalization circuits 124 are implemented to dynamically compensate for the amplitude and phase differentials among the HP and VP paths. As the amplitude and phase effects on the two paths are equalized, the WFs will become orthogonal, and the associated signals can then be precisely reconstituted.

From the point of view of satellite operators, the LP space assets (RF power and frequency bandwidth) from both SCPC channels 112a and 112b are grouped together and shared by two separated users via unique orthogonal waveforms which happen to be conventional RHCP and LHCP. Each SCPC channel transponds one of the aggregated wavefront components (wfc). It always take two components to re-construct relayed signals It should be noted that the two linear transponders may not be from the same satellite. There are occasions that two LP transponders covering same service areas are from two separated satellites.

Figure 2:
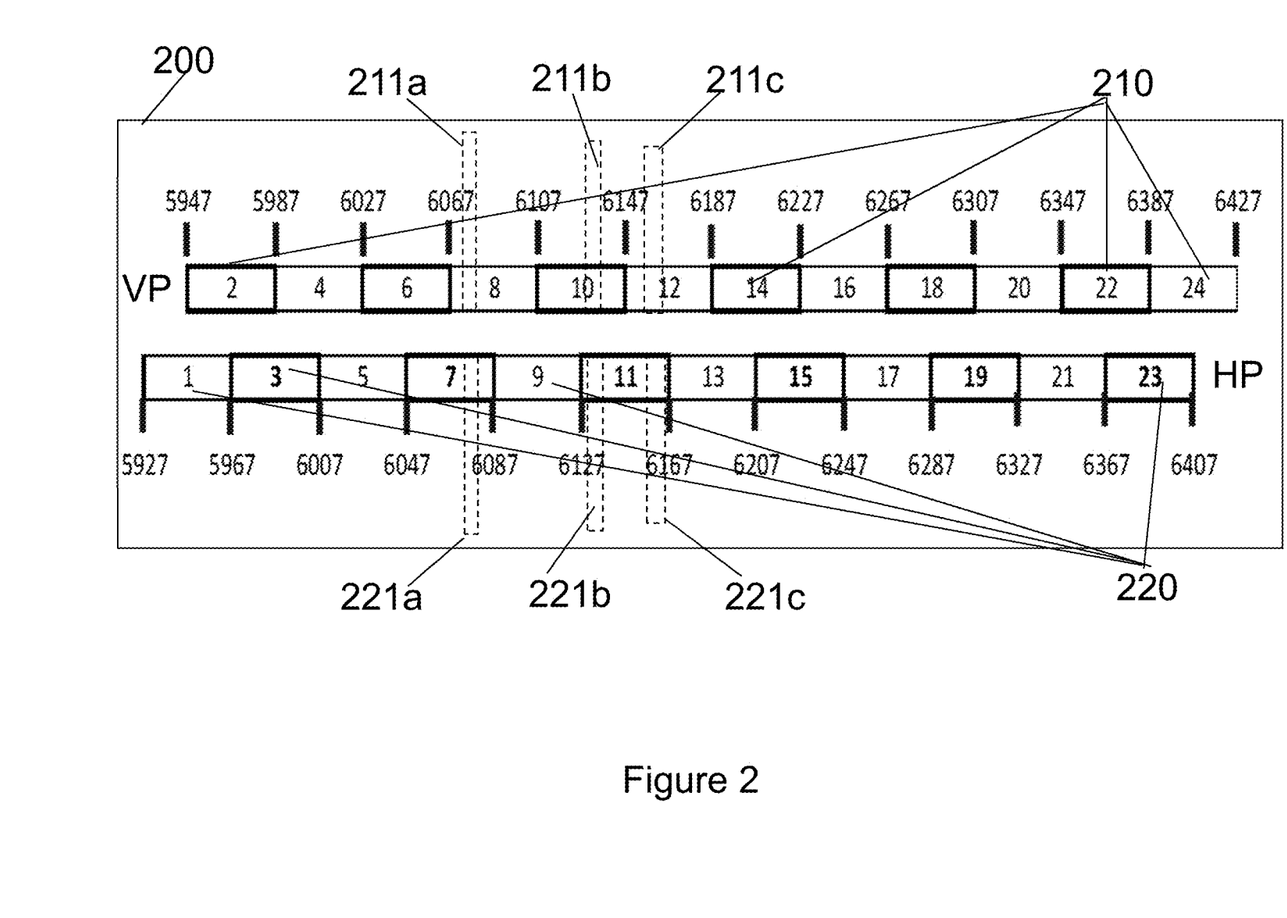
FIG. 2 illustrates three sets of selected SCPC channels on a LP satellite to accommodate CP users. Each set features two SCPC channels on a common frequency slot.

FIG. 2 200 depicts a typical uplink frequency plan of a C-band satellite with 24 transponders; each with 36 MHz bandwidths for individual transponders with a 4 MHz guide band in between two adjacent ones. There are 12 HP and 12 VP transponders, identified as odd 220 and even 210 transponders, respectively. The center frequencies of the two set are offset by 20 MHz.

Among the total 864 MHz (36 MHz*24) available LP bandwidth, 736 MHz are convertible for serving CP users due to a fixed frequency offset among the HP and VP transponders and 4 MHz guard bands among adjacent transponders. The remaining 128 MHz bandwidth can only serve LP users.

Three pairs of the communications channels, (211a, 221a), (211b, 221b), and (211c, 221c), at three different frequency slots are identified. Each pair features a HP and another VP channels illustrates two selected SCPC channels on a LP satellite to accommodate two CP users.

Figure 3:
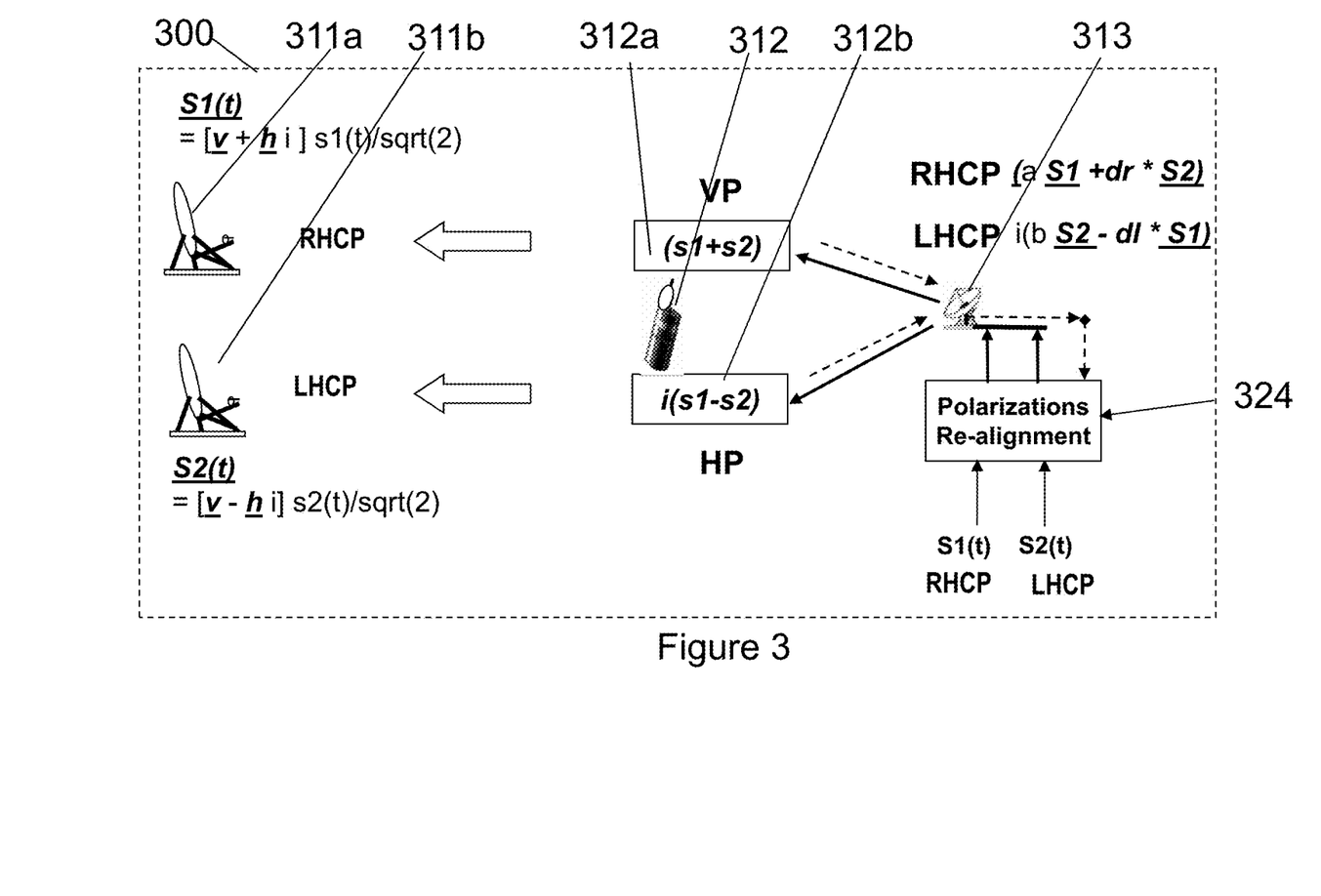
FIG. 3 illustrates the corresponding forward links for the two users in FIG. 1.

FIG. 3 300 depicts the same scenario as that in FIG. 1, except it is for "forward links" communications flows from a CP hub 313 to two CP remotes 311 through a LP satellite 312. A preprocess 324 in the hub is used to "pre-compensate" for the amplitude and phase differentials among the two propagation paths. Since the relay satellite 312 covers both source and destinations. Signals in the corresponding down-link channels for terminal-1 311a and terminal-2 311b are available locally at the source location 313. These signals can be used as those from feedback channels for the pre-compensation processing 324.

Figure 4:
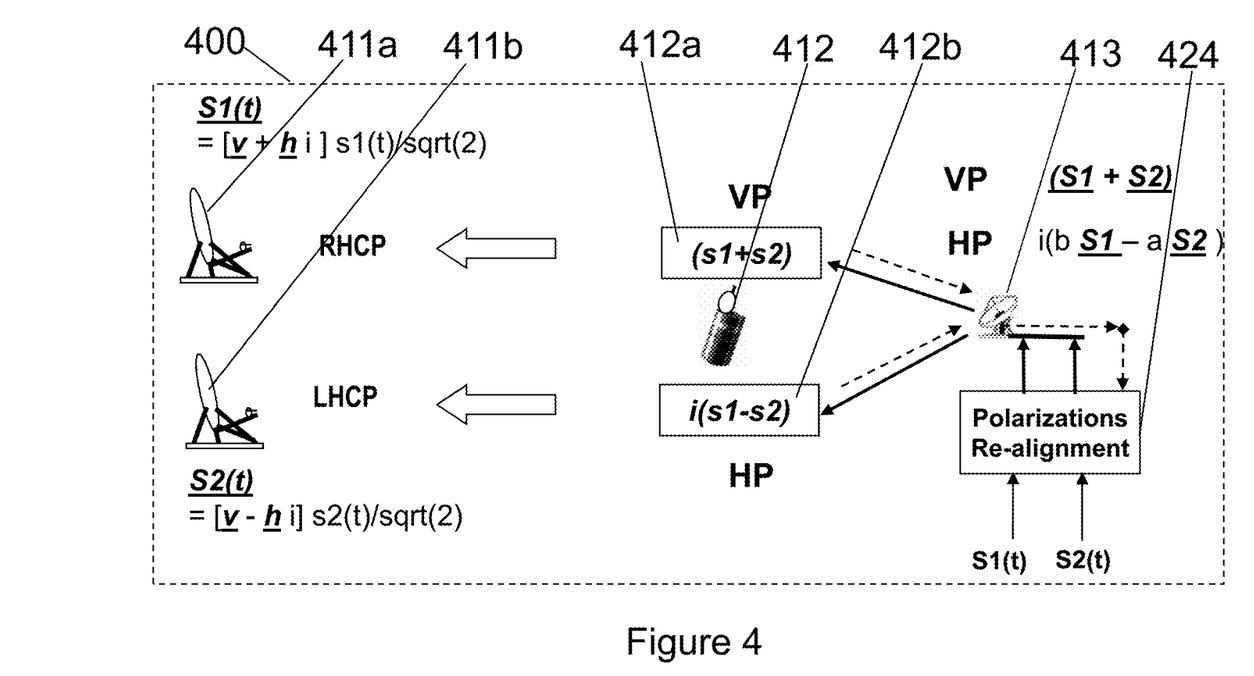
FIG. 4 illustrates the corresponding forward links for the two users in FIG. 1 but from a LP hub.

FIG. 4 400 depicts the similar scenario as that in FIG. 3. Both are for "forward links" communications flows. FIG. 3 is from a CP hub 313 to two CP remotes 311 through a LP satellite 312. This one is from a LP hub 413 to two CP remotes 411 through a LP satellite 412. The LP hub 413 must have transmission functions on both HP and VP polarization. A pre-processor 414 performs two linear combinations combining s1 (the signals for terminal-1 411a), and s2 (the signal for terminal-2 411b) signals. The weightings among the two linear combinations are to generate two equivalent CP signals at anticipated destinations 411, and shall include effects from propagations and unbalanced electronics on ground and in space. Since coverage from the relay satellite 412 includes both the source 413 and the destination locations 411. Signals in the corresponding down-link channels for terminal-1 and terminal-2 are available locally at the source location 413. These signals will be used as those from feedback channels to optimize the pre-compensation processing 414.

Figure 5A:
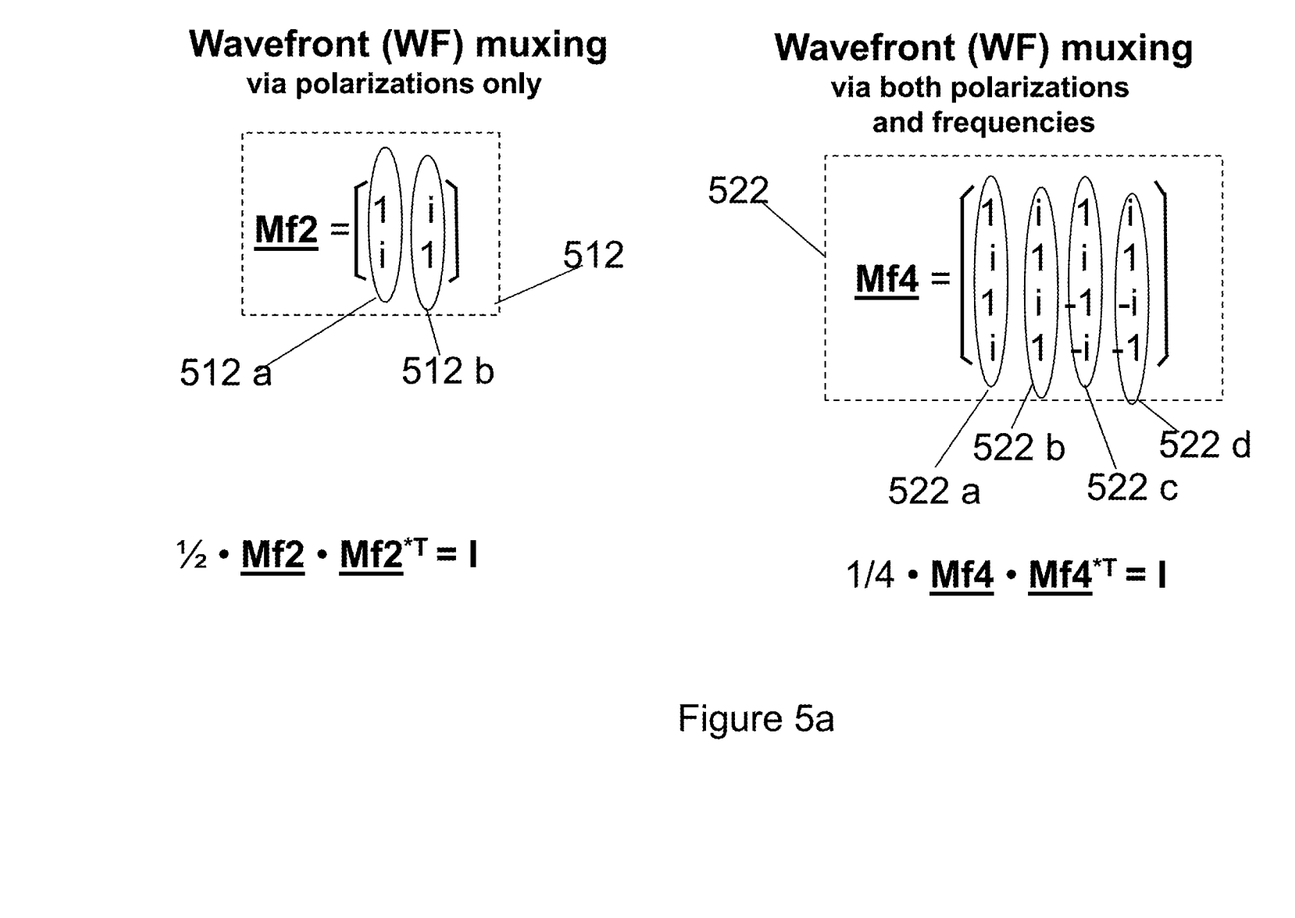
FIG. 5a depicts two mathematic matrixes, with one on the left a 2-to-2 Wavefront muxing matrix for two-signal processing, while the one on the right is a 4-to-4 math matrix. The symmetric matrix on the left is constructed under the constraints that all the user terminals feature only one of the two available CPs. The symmetric matrix on the right is constructed under the constraints that all the user terminals feature only one of the two available CPs but with both frequency slots.

FIG. 5a depicts the two wavefront multiplexing matrixes 512 and 522 for CP user terminals to access multiple communications channels in LP satellites. The 2*2 matrix on the left 512 converts two independent CP signals (one at RHCP 512a and the other at LHCP 512b) into two signal streams in LP (one in HP and the other in VP). All the signal streams (two inputs and two outputs) are at same frequency slot f1.

Similarly, the 4*4 matrix 522 on the right converts 4 independent CP signals (two at RHCP 522a and 522c and the other two at LHCP 522b and 522d). As a result, an input stream is replicated in every output streams, and each output stream consists of all input streams.

Figure 5B:
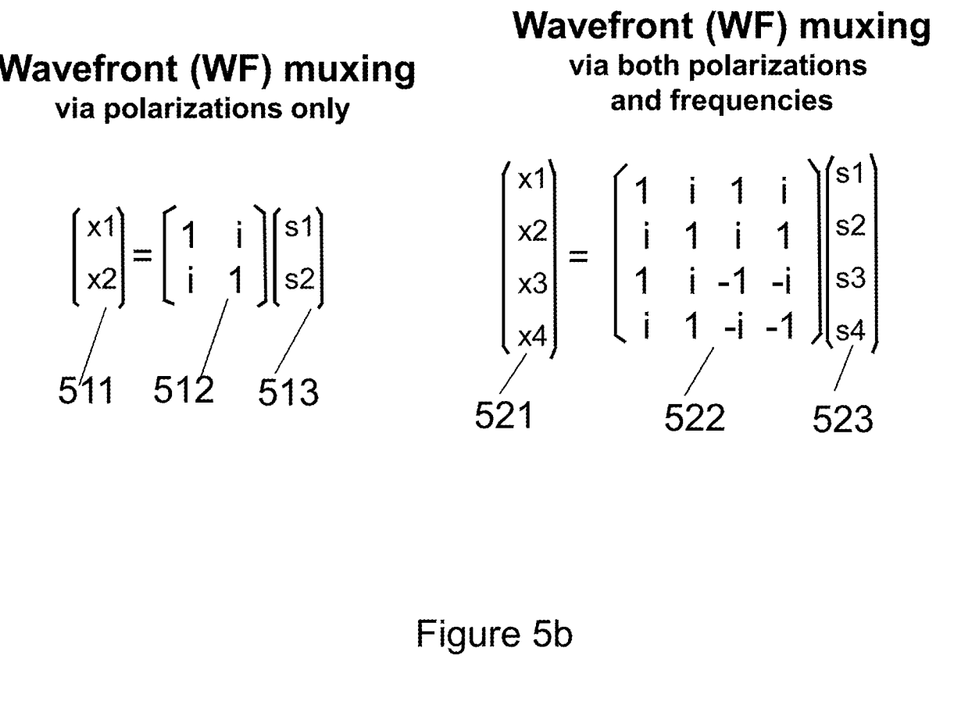
FIG. 5b depicts the two mathematic matrix equations converting CP signals into LP channels as they are captured by LP satellite. The differential propagation effects are not included. The one on the left represents the conversions of two CP signals, s1 in RHCP and s2 in LHCP, into two aggregated LP signals in an HP and a VP SCPC channels. The one on the right is a 4-to-4 mathematic matrix equation representing signal conversions in four LP SCPC channels; two in HP and two in VP at two identical frequency slots. The symmetric matrix is constructed under the constraints that all the user terminals feature only one of the two available CPs but with both frequency slots.

FIG. 5b depicts the two mathematic matrix equations 510 and 520 converting CP signals into LP channels as they are captured by LP satellite. The differential propagation effects are not included. The one on the left 510 represents the conversions of two CP signals 513, s1 in RHCP and s2 in LHCP, into two aggregated LP signals 511 in an HP and a VP SCPC channels. The symmetrical conversion matrix 512 is the WF muxing processor and is referred as Mf2.

$$Mf2 = \begin{bmatrix} 1 & i \\ i & 1 \end{bmatrix} \quad (4a)$$

It is noted that Mf2 can be used to convert two CP signals into two LP signals, and it can also convert two LP signals into two CP signals. Furthermore, $$\tfrac{1}{2} \cdot Mf2 \cdot Mf2^{*T} = I \quad (4b)$$

Mf2 can be used as a WF muxer and its corresponding WF demuxer will be $Mf2^{*T}$. The two resulting wavefronts (WFs) 512a and 512b as depicted in FIG. 5a are orthogonal to each other.

The one on the right 520 is a 4-to-4 mathematic matrix equation representing signal conversions from 4 CP signals 523 in four LP SCPC channels 521; two in HP and two in VP at two identical frequency slots. The symmetric matrix 522 is constructed under the constraints that all the user terminals feature only one of the two available CPs but with both frequency slots.

The symmetrical conversion matrix 522 is the WF muxing processor and is referred as Mf4.

$$Mf4 = \begin{bmatrix} 1 & i & 1 & i \\ i & 1 & i & 1 \\ 1 & i & -1 & -i \\ i & 1 & -i & -1 \end{bmatrix} \quad (5a)$$

It is noted that Mf4 can be used to convert four CP signals into four LP signals, and it can also convert four LP signals into four CP signals. Furthermore, $$\tfrac{1}{4} \cdot Mf4 \cdot Mf4^{*T} = I \quad (5b)$$

Mf4 can be used as a WF muxer and its corresponding WF demuxer will be $Mf4^{*T}$. The four resulting wavefronts (WFs) 522a, 522b, 522c, and 522d as depicted in FIG. 5a are orthogonal to each other.

Figure 5C:
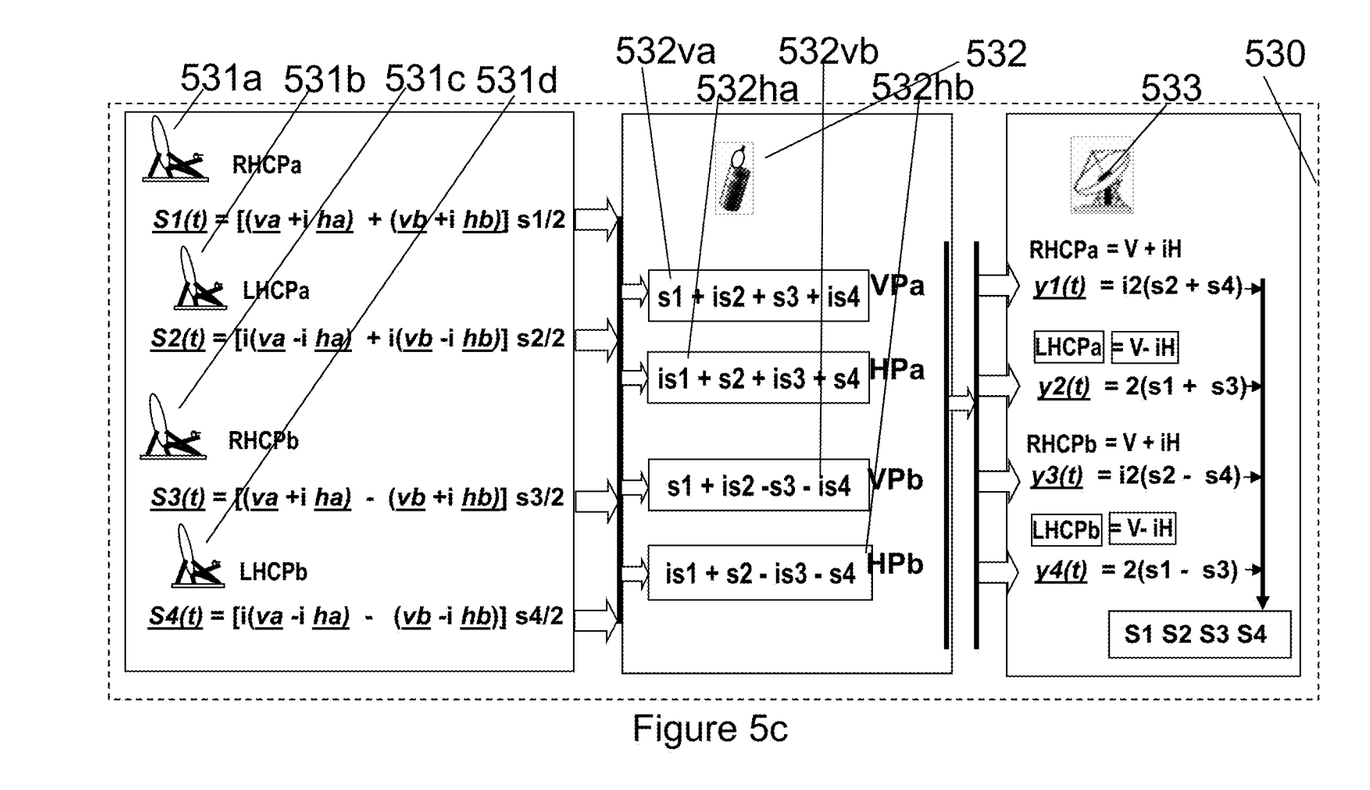
FIG. 5c illustrates a simplified block diagram of a LP satellite accessed by four CP terminals to relay independent data streams back to a CP hub station utilizing the same matrix conversion assumptions in FIG. 5b. It displays return-links from four users to a hub. The architecture is constructed under the constraints that all the user terminals feature only one of the two available CPs but with both frequency slots.

In FIG. 5c 530, we have split the two CP pairs for two common frequency slots; 1 pair of CP at fa and the other pair at fb. Similarly, the two LP pairs are for the same two common frequency slots; 1 pair of LP at fa and the other pair at fb.

S1 is a waveform occupying two RHCP channels one at fa and the other at fb carrying signal s1 radiated by terminal-1 531a.

S2 is a waveform occupying two LHCP channels one at fa and the other at fb carrying signal s2 radiated by terminal-2 531b S3 is a waveform occupying two RHCP channels one at fa and the other at fb carrying signal s3 radiated by terminal-3 531c.

S4 is a waveform occupying two LHCP channels one at fa and the other at fb carrying signal s4 radiated by terminal-4 531d When these signals arrive at a LP satellite 532, the 4 LP channels will feature the following aggregated signals:

VP channel at fa 532va: s1+i s2, +s3+i s4
HP channel at fa 532ha: i s1+s2+i s3+s4
VP channel at fb 532vb: s1+i s2−s3−i s4
HP channel at fb 532hb; i s1+s2−s3−s4

When these LP signals radiated by the LP satellite 532 and arriving at a destination with the CP hub 533, the 4 CP channels will feature the following aggregated signals; assuming the amplitude attenuations and phase delays among the 4 propagation channels are identical:

RHCP channel at fa: y1(t)=i s2+i s4
LHCP channel at fa: y2(t)=s1+s3
RHCP channel at fb: y3(t)=i s2−i s4
LHCP channel at fb; y4(t)=s1−s3

A post processor, not shown, will calculate the s1, s2, s3, and s4 according the received y1, y2, y3, and y4 accordingly. In addition, the post processor must perform amplitudes and phases equalizations among the propagation paths.

The relative phases between the CP components at two frequencies are critical. When the relative geometries among a user 531, a satellite 532 and a hub 533 are fixed, the cumulative phase difference among signals at two separated frequencies propagating from a source 531 via a satellite 532 to a destination 533 is constant. The total accumulated phase difference is therefore a constant. However when a targeted satellite 532 is slowly drifting relative to users 531 and hub 533, the phase differences between two signals at two frequencies propagating from a use source location 531 to a hub 533 will vary accordingly. In addition, there will be additional phase differential due to Doppler effects.

At the destination 533, there are four concurrent receiving functions; RHCPa, RHCPb, LHCPa, and LHCPb. The associated phase and amplitude differential effects among the 4 propagation channels at different frequencies and polarizations must be continuously calibrated and equalized to assure the orthogonality among multiple WFs when arriving at the destination 533.

Figure 5D:
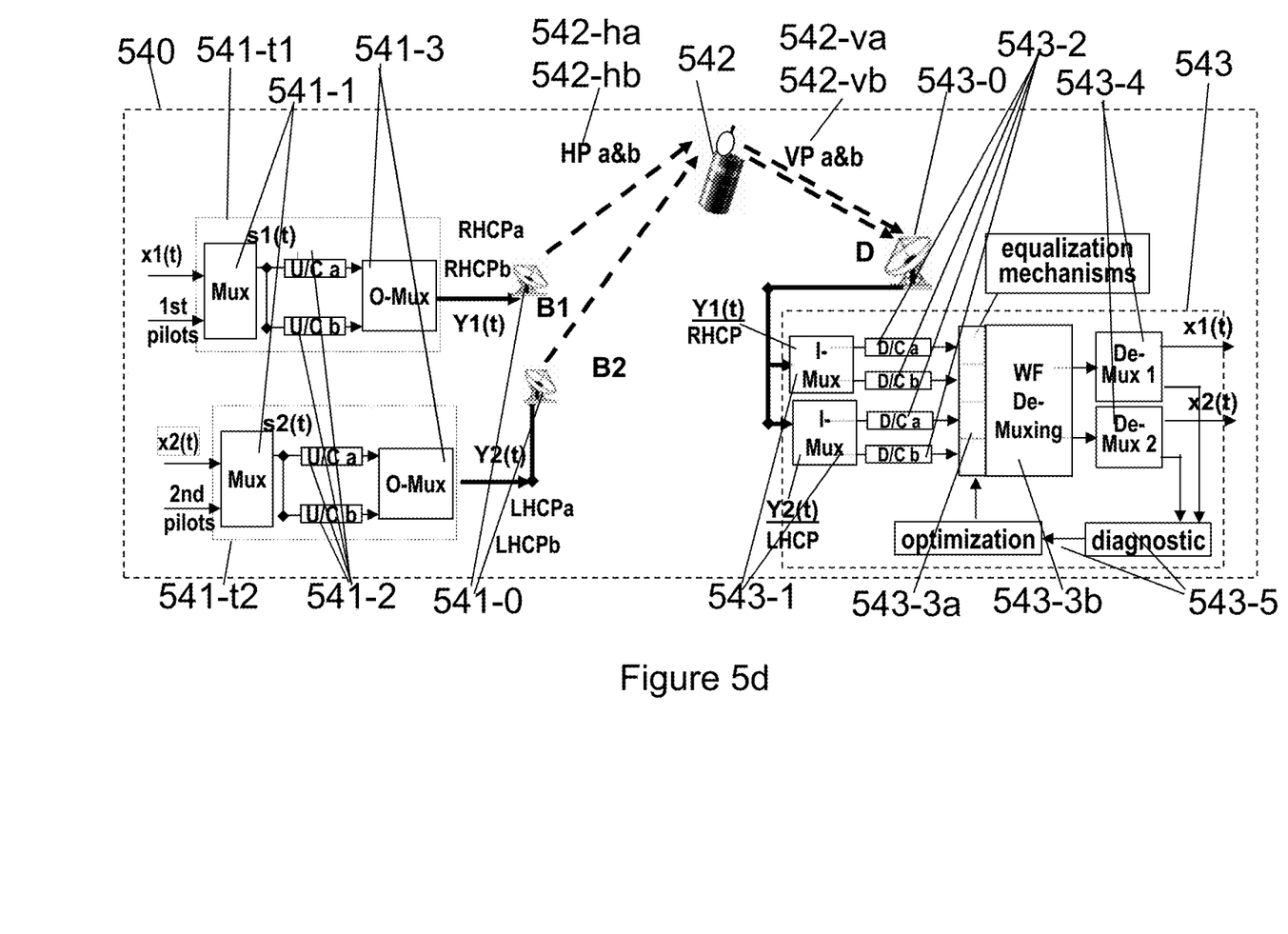
FIG. 5d illustrates a simplified block diagram of an implementation technique for FIG. 5c. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

FIG. 5d 540 illustrates a simplified block diagram of an implementation technique for FIG. 5c. Standard low-noise amplifiers (LNAs) and high power amplifiers (HPAs) are not shown. It depicts top level implementation concepts for the hub 533 as well as two 531a and 531b of the four users 531. The terminal 541-t1 for a first user 531a features transmissions of an identical signal stream s1 via two RHCP channels at fa and fb simultaneously. Embedded pilots for diagnostics are multiplexed 541-1 with a transmission stream x1(t). The mux processing may be a standard technique such as TDM, FDM, or CDM minimizing bandwidth assets dedicated to probe signals support the optimization loop 543-5 at the destination. The muxed signals are frequency up-converted 541-2 to two predetermined frequency slots before combined by a FDM output mux 541-3. The muxed signals are amplified and radiated by an antenna 541-0 to the designated satellite 542.

Similarly, the terminal 541-t2 for a second user 531b features transmissions of another identical signal stream s2 via two LHCP channels at fa and fb simultaneously. Embedded pilots for diagnostics are multiplexed 541-1 with a transmission stream x1(t). The mux processing may be a standard technique such as TDM, FDM, or CDM minimizing bandwidth assets dedicated to probe signals support the optimization loop 543-5 at the destination. The muxed signals are frequency up-converted 541-2 to two predetermined frequency slots before combined by a FDM output mux 541-3. The muxed signals are amplified and radiated by an antenna 541-0 to the designated satellite 542.

The selected satellite 542 provides two pairs of LP SCPC channels; the inputs for the first ones 542-*ha* and 542-*va* are at fa, and those for the other set 542-*hb* and 542-*vb* are at fb. The corresponding output frequencies are at fa' and fb' respectively.

At the destination 543, the antenna 543-0 features both RHCP and LHCP ports independently. The received RHCP signals Y1(t) and LHCP signals Y2(t) after conditioned (amplified and filtered), FDM de-muxed 543-1 and frequency down converted 543-2 are fed into a bank of electronic filters 543-3*a* as equalization mechanism before the WF demuxing processor 543-3*b*. The WF demuxer 543-3*b* features 4 output ports dedicated for the four users 531. Only two of the four are using the space asset for this example.

The corresponding outputs are de-muxed 543-4 separating desired signals x1(t), x2(t) and two sets of probe signals. The recovered probing signals are used by the optimization loop 543-5 as diagnostic signals to equalize phase and amplitude differentials among multiple paths for orthogonal WF reconstructions.

Figure 6:
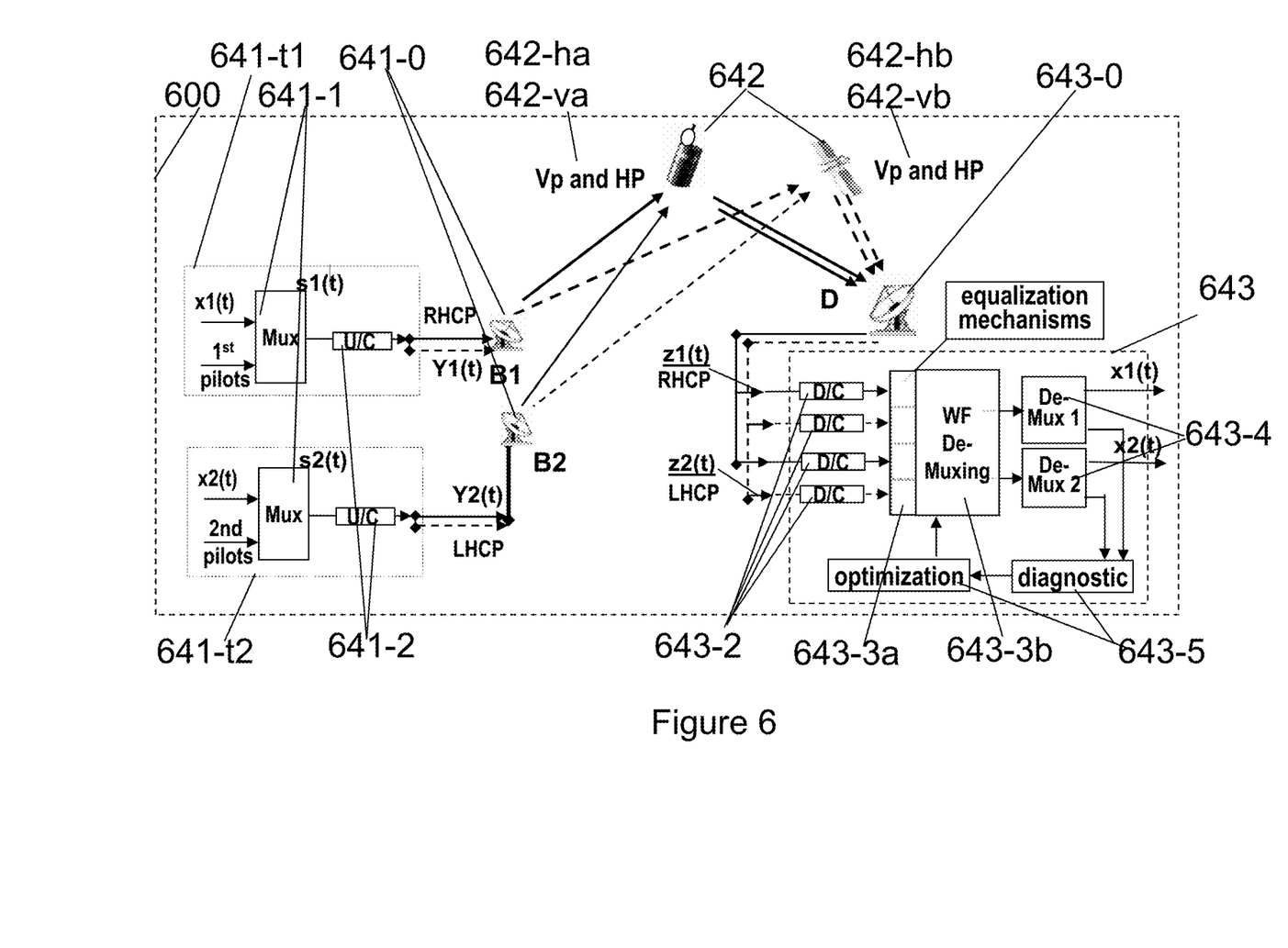
FIG. 6 illustrates a simplified block diagram of an implementation technique similar to for FIG. 5d. It is for scenarios with multiple LP channels in two satellites at a common frequency slot, instead of multiple LP channels in two common frequency slots in a satellite. Standard low-noise amplifiers (LNAs) and high power amplifiers (HPAs) are not shown. Diagnostic signals (pilots) are embedded to equalize phase and amplitude differentials among multiple paths for orthogonal WF reconstructions.

FIG. 6 600 illustrates a simplified block diagram of an implementation technique similar to for FIG. 5*d*. It is for scenarios with multiple LP channels in two satellites 642 at a common frequency slot, instead of multiple LP channels in two common frequency slots in a satellite. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

The terminal 641-t1 for a first user 531a features transmissions of an identical signal stream s1 via two RHCP channels at fa via two satellites concurrently. The satellites covers a common service area for all users and the hubs from two separated orbital spots. Embedded pilots for diagnostics are multiplexed 641-1 with a transmission stream x1(t). The mux processing may be a standard technique such as TDM, FDM, or CDM minimizing bandwidth assets dedicated to probe signals support the optimization loop 643-5 at the destination. The muxed signals are frequency up-converted 641-2 to a predetermined frequency slot, and then amplified, power split into two signal paths, and then radiated by a multi-beam antenna 641-0 to two designated satellites 642 individually.

Similarly, the terminal 641-t2 for a second user 531b features transmissions of another identical signal stream s2 via two LHCP channels at fa via two satellite simultaneously. Embedded pilots for diagnostics are multiplexed 641-1 with a transmission stream x2(t). The mux processing may be a standard technique such as TDM, FDM, or CDM minimizing bandwidth assets dedicated to probe signals which support the optimization loop 643-5 at the destination. The muxed signals are frequency up-converted 641-2 to a predetermined frequency slot, amplified, divided into two paths and then radiated by a multi-beam antenna 641-0 to the two designated satellite 642.

The selected satellites 642 provides two pairs of LP SCPC channels; the inputs for the first ones 642-*ha* and 642-*va* are at satellite-1, and those for the other set 642-*hb* and 642-*vb* are at the second satellite. The corresponding output frequencies are at fa'.

At the destination 643, the multi-beam antenna 643-0 features both RHCP and LHCP ports independently aiming at both satellites. The two received RHCP signals Y1(t), Y3(t) and two Rx LHCP signals Y2(t) and Y4(t) after conditioned (amplified and filtered), and frequency down converted 643-2 are fed into a bank of electronic filters 643-3*a* as equalization mechanism before the WF demuxing processor 643-3*b*. The WF demuxer 643-3*b* features 4 output ports dedicated for the four users 531. Only two of the four are using the space asset for this example.

The corresponding outputs are de-muxed 643-4 separating desired signals x1(t), x2(t) and two sets of probe signals. The recovered probing signals are used by the optimization loop 543-5 as diagnostic signals to equalize phase and amplitude differentials among multiple paths for orthogonal WF reconstructions.

What is claimed is:

1. A satellite communications system for communicating at a first frequency slot with a first pair of satellite transponders in linear polarization format and a second pair of satellite transponders in linear polarization format, the satellite communications system comprising:

a first terminal configured for receiving at least one first input signal including a first pilot signal, processing the at least one first input signal, outputting a first output signal, and concurrently radiating the first output signal at the first frequency slot to the first pair of satellite transponders via a first beam in right-hand circularly polarized format and to the second pair of satellite transponders via a second beam in right-hand circularly polarized format;

a second terminal configured for receiving at least one second input signal including a second pilot signal, processing the at least one second input signal, outputting a second output signal, and concurrently radiating the second output signal in the first frequency slot to the first pair of satellite transponders via a third beam in left-hand circularly polarized format and to the second pair of satellite transponders via a fourth beam in left-hand circularly polarized format; and a station configured for receiving first and second satellite signals from the first pair of satellite transponders, third and fourth satellite signals from the second pair of satellite transponders, each of the first, second, third, and fourth satellite signals comprising a linear combination of the first output signal and the second output signal, the station comprising:

a multi-beam antenna configured for receiving the first, second, third, and fourth satellite signals;

a set of frequency-down-converters coupled to the multi-beam antenna and configured for receiving and frequency-down-converting the first, second, third, and fourth satellite signals and outputting a set of down-converted signals;

an equalization unit coupled to the set of frequency-down-converters and configured for receiving and equalizing the down-converted signals and outputting equalized signals;

a wavefront de-multiplexer coupled to the equalization unit and configured for receiving the equalized signals, performing a wavefront de-multiplexing transformation on the equalized signals, and outputting at least one first recovered signal and at least one second recovered signal, the at least one first recovered signal being a recovered version of the at least one first input signal and including a first recovered pilot signal, the at least one second recovered signal being a recovered version of the at least one second input signal and including a second recovered pilot signal, the first and second recovered pilot signals being recovered versions of the first and second pilot signals, respectively; and an optimizer configured for optimizing orthogonality of the wavefront de-multiplexer using the first and second recovered pilot signals.

2. The satellite communications system of claim 1, wherein the at least one first input signal further comprises at least one first user signal, and wherein the at least one second input signal further comprises at least one second user signal.

3. The satellite communications system of claim 2, wherein the first terminal comprises:

a first multiplexer configured for receiving the at least one first input signal, performing a multiplexing operation on the at least one first input signal, and outputting a first multiplexed signal;

a first frequency-up-converter coupled to the first multiplexer and configured for receiving the first multiplexed signal, frequency-up-converting the first multiplexed signal to the first frequency slot, and outputting a first up-converted signal;

a first amplifier unit coupled to the first frequency-up-converter and configured for receiving and amplifying the first up-converted signal, outputting the first output signal and power splitting the first output signal for a first signal path and a second signal path; and a first multi-beam antenna coupled to the first amplifier unit and configured for radiating the first output signal received from the first signal path to the first pair of satellite transponders via the first beam in right-hand circularly polarized format, and radiating the first output signal received from the second signal path to the second pair of satellite transponders via the second beam in right-hand circularly polarized format.

4. The satellite communications system of claim 2, wherein the second terminal comprises:

a second multiplexer configured for receiving the at least one second input signal, perform a multiplexing operation on the at least one second input signal, and outputting a second multiplexed signal;

a second frequency-up-converter coupled to the second multiplexer and configured for receiving the second multiplexed signal, frequency-up-convert the second multiplexed signal to the first frequency slot, and outputting a second up-converted signal;

a second amplifier unit coupled to the second frequency-up-converter and configured for receiving and amplifying the second up-converted signal, outputting the second output signal and power splitting the second output signal for a third signal path and a fourth signal path; and a second multi-beam antenna coupled to the second amplifier unit, the second multi-beam antenna radiating the second output signal received from the third signal path to the first pair of satellite transponders via the third beam in left-hand circularly polarized format, and radiating the second output signal received from the fourth signal path to the second pair of satellite transponders via the fourth beam in left-hand circularly polarized format.

5. The satellite communications system of claim 3, wherein the first multiplexer comprises a time division multiplexer or a frequency division multiplexer or a code division multiplexer.

6. The satellite communications system of claim 4, wherein the second multiplexer comprises a time division multiplexer or a frequency division multiplexer or a code division multiplexer.

7. The satellite communications system of claim 2, wherein the station further comprises:

a first de-multiplexer coupled to the wavefront de-multiplexer and configured for receiving and de-multiplexing the at least one first recovered signal, and outputting at least one recovered first user signal and the first recovered pilot signal; and a second de-multiplexer coupled to the wavefront de-multiplexer and configured for receiving and de-multiplexing the at least one second recovered signal, and outputting at least one recovered second user signal and the second recovered pilot signal.

8. The satellite communications system of claim 7, wherein the optimizer is configured for equalizing phase and amplitude differentials.

9. The satellite communications system of claim 1, wherein the first and second satellite signals are outputted by the first pair of satellite transponders in response to receiving as inputs the first output signal and the second output signal, and wherein the third and fourth satellite signals are outputted by the second pair of satellite transponders in response to receiving as inputs the first output signal and the second output signal.

10. A method for communicating at a first frequency slot with a first pair of satellite transponders in linear polarization format and a second pair of satellite transponders in linear polarization format, the method comprising:

receiving, via a first terminal, at least one first input signal including a first pilot signal;

processing, via the first terminal, the at least one first input signal;

outputting, via the first terminal, a first output signal;

radiating concurrently, via the first terminal, the first output signal at the first frequency slot to the first pair of satellite transponders via a first beam in right-hand circularly polarized format and to the second pair of satellite transponders via a second beam in right-hand circularly polarized format;

receiving, via a second terminal, at least one second input signal including a second pilot signal;

processing, via the second terminal, the at least one second input signal;

outputting, via the second terminal, a second output signal;

radiating concurrently, via the second terminal, the second output signal at the first frequency slot to the first pair of satellite transponders via a third beam in left-hand circularly polarized format and to the second pair of satellite transponders via a fourth beam in left-hand circularly polarized format;

receiving, via a multi-beam antenna included in a station, first and second satellite signals from the first pair of satellite transponders, third and fourth satellite signals from the second pair of satellite transponders, each of the first, second, third, and fourth satellite signals comprising a linear combination of the first output signal and the second output signal;

receiving and frequency-down-converting the first, second, third, and fourth satellite signals and outputting a set of down-converted signals, via a set of frequency-down-converters coupled to the multi-beam antenna;

receiving and equalizing the down-converted signals and outputting equalized signals, via an equalization unit coupled to the set of frequency-down-converters;

receiving the equalized signals, performing a wavefront de-multiplexing transformation on the equalized signals, and outputting at least one first recovered signal and at least one second recovered signal, via a wavefront de-multiplexer coupled to the equalization unit, the at least one first recovered signal being a recovered version of the at least one first input signal and including a first recovered pilot signal, the at least one second recovered signal being a recovered version of the at least one second input signal and including a second recovered pilot signal, the first and second recovered pilot signals being recovered versions of the first and second pilot signals, respectively; and optimizing orthogonality of the wavefront de-multiplexer using the first and second recovered pilot signals.

11. The method of claim 10 further comprising:
multiplexing, via a first multiplexer included in the first terminal, at least one first user signal and the first pilot signal to generate the at least one first input signal; and
multiplexing, via a second multiplexer included in the second terminal, at least one second user signal and the second pilot signal to generate the at least one second input signal.

12. The method of claim 10 further comprising:
receiving and de-multiplexing the at least one first recovered signal, and outputting at least one recovered first user signal and the first recovered pilot signal, via a first de-multiplexer coupled to the wavefront de-multiplexer; and
receiving and de-multiplexing the at least one second recovered signal, and outputting at least one recovered second user signal and the second recovered pilot signal, via a second de-multiplexer coupled to the wavefront de-multiplexer.

13. A satellite communications system for communicating with a satellite, the satellite comprising a first pair of satellite transponders in linear polarization format for receiving signals at a first frequency slot and a second pair of satellite transponders in linear polarization format for receiving signals at a second frequency slot, the satellite communications system comprising:
a first terminal configured for receiving at least one first input signal including a first pilot signal, processing the at least one first input signal, outputting a first output signal, and concurrently radiating the first output signal at the first frequency slot and at the second frequency slot to the satellite via first and second channels in right-hand circularly polarized format;
a second terminal configured for receiving at least one second input signal including a second pilot signal, processing the at least one second input signal, outputting a second output signal, and concurrently radiating the second output signal at the first frequency slot and at the second frequency slot to the satellite via third and fourth channels in left-hand circularly polarized format; and
a station configured for receiving a first satellite signal and a second satellite signal from the first pair of satellite transponders, a third satellite signal and a fourth satellite signal from the second pair of satellite transponders, each of the first, second, third, and fourth satellite signals being a linear combination of the first output signal and the second output signal, the station comprising:
a multi-beam antenna configured for receiving the first, second, third, and fourth satellite signals;
a set of frequency division de-multiplexers coupled to the multi-beam antenna and configured for de-multiplexing the first, second, third, and fourth satellite signals and outputting a set of frequency de-multiplexed signals;
a set of frequency-down-converters coupled to the set of frequency division de-multiplexers and configured for receiving and frequency-down-converting the frequency de-multiplexed signals and outputting a set of down-converted signals;
an equalization unit coupled to the set of frequency-down-converters and configured for receiving and equalizing the down-converted signals and outputting equalized signals;
a wavefront de-multiplexer coupled to the equalization unit and configured for receiving the equalized signals, performing a wavefront multiplexing transformation on the equalized signals, and outputting at least one first recovered signal and at least one second recovered signal, the at least one first recovered signal being a recovered version of the at least one first input signal and including a first recovered pilot signal, the at least one second recovered signal being a recovered version of the at least one second input signal and including a second recovered pilot signal, the first and second recovered pilot signals being recovered versions of the first and second pilot signals, respectively; and
an optimizer configured for optimizing orthogonality of the wavefront de-multiplexer using the first and second recovered pilot signals.

14. The satellite communications system of claim 13, wherein the at least one first input signal further comprises at least one first user signal, and wherein the at least one second input signal further comprises at least one second user signal.

15. The satellite communications system of claim 14, wherein the first terminal comprises:
a first multiplexer configured for receiving the at least one first input signal, performing a multiplexing operation on the at least one first input signal, and outputting a first multiplexed signal;
a set of first frequency-up-converters coupled to the first multiplexer- and configured for receiving the first multiplexed signal, frequency-up-converting the first multiplexed signal to the first frequency slot and to the second frequency slot, and outputting first up-converted signals;

a first frequency division multiplexer coupled to the set of first frequency-up-converters, and configured for receiving and combining the first up-converted signals and outputting a first frequency multiplexed signal; and a first antenna coupled to the frequency division multiplexer- and configured for radiating the first frequency multiplexed signal to the satellite via the first and second channels in right-hand circularly polarized format.

16. The satellite communications system of claim 14, wherein the second terminal comprises:
   a second multiplexer configured for receiving the at least one second input signal, performing a multiplexing operation on the at least one second input signal, and outputting a second multiplexed signal;
   a set of second frequency-up-converters coupled to the second multiplexer and configured for receiving the second multiplexed signal, frequency-up-converting the second multiplexed signal to the first frequency slot and to the second frequency slot, and outputting second up-converted signals;
   a frequency division multiplexer coupled to the set of second frequency-up-converters and configured for receiving and combining the second up-converted signals and outputting a second frequency multiplexed signal; and
   a second antenna coupled to the second frequency division multiplexer, and configured for radiating the second frequency multiplexed signal to the satellite via the third and fourth channels in left-hand circularly polarized format.

17. The satellite communications system of claim 15, wherein the first multiplexer comprises a time division multiplexer or a frequency division multiplexer or a code division multiplexer.

18. The satellite communications system of claim 16, wherein the second multiplexer comprises a time division multiplexer or a frequency division multiplexer or a code division multiplexer.

19. The satellite communications system of claim 14, wherein the station further comprises:
   a first de-multiplexer coupled to the wavefront de-multiplexer and configured for receiving and de-multiplexing the at least one first recovered signal, and outputting at least one recovered first user signal and the first recovered pilot signal; and
   a second de-multiplexer coupled to the wavefront de-multiplexer and configured for receiving and de-multiplexing the at least one second recovered signal, and outputting at least one recovered second user signal and the second recovered pilot signal.

20. The satellite communications system of claim 19, wherein the optimizer is configured for equalizing phase and amplitude differentials.

* * * * *